United States Patent
Hergt et al.

(10) Patent No.: US 11,223,287 B2
(45) Date of Patent: Jan. 11, 2022

(54) RESONANT DC-DC CONVERTER

(71) Applicant: Siemens Aktiengesellschaft, Munich (DE)

(72) Inventors: Martin Hergt, Nuremberg (DE);
Marcel Lutze, Nuremberg (DE);
Sebastian Nielebock, Forchheim (DE);
Markus Pfeifer, Nuremberg (DE);
Markus Zocher, Wolframs-Eschenbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 3 days.

(21) Appl. No.: 16/649,645

(22) PCT Filed: Aug. 22, 2018

(86) PCT No.: PCT/EP2018/072642
§ 371 (c)(1),
(2) Date: Mar. 21, 2020

(87) PCT Pub. No.: WO2019/063211
PCT Pub. Date: Apr. 4, 2019

(65) Prior Publication Data
US 2020/0274452 A1 Aug. 27, 2020

(30) Foreign Application Priority Data
Sep. 29, 2017 (EP) .................................... 17193977

(51) Int. Cl.
*H02M 3/335* (2006.01)
*H02M 3/00* (2006.01)
*H02M 1/00* (2006.01)

(52) U.S. Cl.
CPC ......... *H02M 3/33573* (2021.05); *H02M 3/01* (2021.05); *H02M 1/0058* (2021.05); *H02M 1/0064* (2021.05); *H02M 1/0077* (2021.05)

(58) Field of Classification Search
CPC ............. H02M 1/0058; H02M 1/0064; H02M 1/0077; H02M 3/01; H02M 3/015; H02M 3/335–337
See application file for complete search history.

(56) References Cited

U.S. PATENT DOCUMENTS

| 4,641,232 A | * | 2/1987 | Pitel | .................... | H02M 7/4807 363/71 |
| 8,466,658 B2 | * | 6/2013 | Kajouke | ........... | H02M 3/33584 320/128 |

(Continued)

FOREIGN PATENT DOCUMENTS

| RU | 2593148 C1 | 7/2016 |
| WO | WO 2008-079870 A2 | 7/2008 |

OTHER PUBLICATIONS

PCT International Search Report and Written Opinion of International Searching Authority dated Dec. 13, 2018 corresponding to PCT International Application No. PCT/EP2018/072642 filed Aug. 22, 2018.

*Primary Examiner* — Fred E Finch, III
(74) *Attorney, Agent, or Firm* — Henry M. Feiereisen LLC

(57) ABSTRACT

A resonant DC-DC converter includes an inverter circuit, a rectifier circuit and a transformer unit. The inverter circuit is connected to a first terminal of the transformer unit, and the rectifier circuit is connected to a second terminal of the transformer unit. The first and second terminals are galvanically isolated from one another by a first transformer. The transformer unit is configured to adapt a transformation ratio of the transformer unit. The transformer unit has an energy (Continued)

transmission path which includes an inverter and a second transformer, with an input of the energy transmission path being arranged parallel to a primary side of the first transformer and an output of the energy transmission path being arranged in series with the secondary side of the first transformer.

3 Claims, 2 Drawing Sheets

(56) References Cited

U.S. PATENT DOCUMENTS

| | | | |
|---|---|---|---|
| 2002/0064057 A1 | 5/2002 | Zhang et al. | |
| 2009/0201700 A1* | 8/2009 | Aso | H02M 3/337 363/17 |
| 2012/0087157 A1* | 4/2012 | Huang | H02M 7/5387 363/37 |
| 2014/0153290 A1 | 6/2014 | Li et al. | |
| 2015/0229216 A1 | 8/2015 | Kyono | |
| 2016/0190933 A1* | 6/2016 | Lee | H02M 3/3378 363/17 |
| 2017/0027027 A1 | 1/2017 | Doebbeler et al. | |
| 2018/0197673 A1* | 7/2018 | Njiende | H01F 27/06 |
| 2018/0294732 A1* | 10/2018 | Ye | H02M 3/33546 |
| 2019/0222129 A1* | 7/2019 | Wang | H02M 3/33569 |
| 2020/0204079 A1* | 6/2020 | Guo | H02M 3/335 |
| 2020/0358355 A1* | 11/2020 | Zambetti | H02M 7/4807 363/71 |

* cited by examiner

RESONANT DC-DC CONVERTER

CROSS-REFERENCES TO RELATED APPLICATIONS

This application is the U.S. National Stage of International Application No. PCT/EP2018/072642, filed Aug. 22, 2018, which designated the United States and has been published as International Publication No. WO 2019/063211 A1 and which claims the priority of European Patent Application, Serial No. 17193977.0, filed Sep. 29, 2017, pursuant to 35 U.S.C. 119(a)-(d).

BACKGROUND OF THE INVENTION

The invention relates to a resonant DC chopper with an inverter circuit, a rectifier circuit and a transformer unit, wherein the inverter circuit is connected to a first terminal of the transformer unit and the rectifier circuit is connected to a second terminal of the transformer unit.

DC choppers are used in order to vary the voltage level of a DC voltage. They are also referred to as DC converters or DC-DC choppers or DC-DC converters. With the aid of semiconductors, the voltage on the input side of the DC chopper is converted into a predefinable voltage on the output side of the DC chopper. In order to reduce the switching losses in the semiconductors of the DC chopper, in resonant DC choppers alternating currents are generated, during which switching operations are carried out in or close to the zero crossings of the currents. Often, the input and output of DC choppers are galvanically isolated from one another.

The resonant converters are advantageous in the region close to the resonance frequency, where the switch-on or switch-off losses of the semiconductors are lowest. If the spacing between the frequencies of the operating point and the resonance is increased, then the switching losses increase continuously. In addition to increasing the switch-on or switch-off losses, the current also loses its sinusoidal characteristic in the resonant network and thus has a spectrum with a wide bandwidth in the frequency range which requires an elaborate filtering at the output of the resonant converter. Due to the low switch-on and switch-off losses, the resonant converter also has its best degree of efficiency close to or directly at the resonance frequency; otherwise the resonant converter has similar degrees of efficiency to a conventional hard-switching topology.

Resonant converters, which are intended to cover a large range of input and output voltages, are mostly operated over a wide frequency range, which leads to the disadvantages given above. In an extreme case, the resonant converter is operated in the purely capacitive or inductive range.

Currently, DC choppers are used over a large dynamic range of input and output voltages with conventional hard-switching topologies. Resonant structures are mostly only used with constant loads or low load fluctuations. In these situations, they can be operated directly at or close to their resonance frequency and have the advantages cited above.

According to the current prior art, hard-switching full-bridges are used for a large range of input and output voltages. The circuit functions as follows. The input-side inverter circuit provides an AC voltage for the transformer. This is generated by the alternating switching-on of the semiconductors of the inverter circuit. In order to control the voltage-time integral and therefore the power flow, a switch-on period between 0% and 50% Is set. The primary voltage of the transformer generated in this way is transferred to the secondary side depending on the transformation ratio and is rectified with the aid of the rectifier circuit.

In this topology, the switching losses of the semiconductors can be observed clearly. In addition, the current in the shunt arm of the full-bridge circuit has a very wide bandwidth in the frequency range and requires a large output filter for smoothing. The advantage of this arrangement, however, lies in the large setting range of the input and output voltages.

In a resonant-switching inverter circuit of a DC chopper, a sinusoidal current is generated which flows through the transformer and thus can be switched on and off in a current-free manner by the recurring zero crossing. The resonant circuit which generates the sinusoidal current is a series connection of a capacitance and an inductance in the bridge arm of the inverter circuit. By switching the semiconductors of the inverter circuit, a sinusoidal current is produced, which is transferred via the transformer and rectified on the secondary side by means of the rectifier circuit. A capacitor at the output of the rectifier circuit serves to smooth the rectified voltage. The actuation of the switch can take place slightly below resonance ($f_s<f_r$), at resonance ($f_s=f_r$) or slightly above resonance ($f_s>f_r$), depending on the level of the frequency at which the inverter circuit is operated. The resonant operation is therefore ensured with a continuously sinusoidal current. Should the switching frequency be vastly below or above resonance, then the current characteristic is not sinusoidal. It is therefore necessary for the resonant-switching inverter circuit to be constantly operated in the range of the resonance frequency in order to avoid filters in the bridge arm which are elaborate and subject to loss.

The object underlying the invention is to improve a resonant DC chopper.

SUMMARY OF THE INVENTION

This object is achieved by a resonant DC chopper with an inverter circuit, a rectifier circuit and a transformer unit, wherein the inverter circuit is connected to a first terminal of the transformer unit and the rectifier circuit is connected to a second terminal of the transformer unit, wherein the first and the second terminal are galvanically isolated from one another by means of a first transformer, wherein the transformer unit has means for adapting the transformation ratio of the transformer unit, wherein the transformer unit has an energy transfer path, wherein the energy transfer path has an inverter and a second transformer, wherein the input of the energy transfer path is arranged in parallel with the primary side of the first transformer and the output of the energy transfer path is arranged in series with the secondary side of the first transformer.

Further advantageous embodiments of the invention are specified in the dependent claims.

The invention is based on the knowledge that a variable transformation ratio of the transformer unit enables the loss behavior of the DC chopper to be considerably improved. In this context, a variable transformation ratio means that the ratio of output voltage to input voltage of the transformer unit can be varied. This can be achieved, for example, by a variable transformation ratio of the first transformer. For this purpose, the first transformer may be embodied with a tap changer.

In addition, it is possible to add a further voltage to the output voltage of the first transformer, i.e. to the voltage of the secondary side of the first transformer. For example, this can be carried out by a series connection of the secondary side of the transformer output to the voltage of an energy transfer path. In this context, it is particularly advantageous if the voltage added is variable. This voltage can be generated, for example, in a variable manner with the aid of an inverter. By way of a second transformer present in the energy transfer path, the output of the energy transfer path is furthermore potential-free, meaning that this voltage is able to be added to the output voltage of the first transformer without problems when the secondary side of the first transformer and the output of the energy transfer path are arranged in a series connection.

In this context, it is particularly advantageous if the inverter is connected to the primary side of the first transformer, as then the same semiconductors can be used for the inverter with regard to the reverse voltages required as are also present in the inverter circuit. It is therefore possible for inverter and inverter circuit to be constructed in a simple manner using comparable or even the same semiconductors.

It has been found here that a particularly effective reduction of the losses of the DC chopper is then able to be achieved if 75% of the power to be transferred by the DC chopper is transferred via the first transformer and 25% of the power to be transferred by the DC chopper is transferred via the energy transfer path. The first transformer then possesses three times the performance compared to the second transformer.

Due to the variable transformation ratio of the transformer unit, it is possible to increase the dynamic range of the resonant DC chopper via a large range of input and output voltages with the aid of an actuator which is located directly in the first transformer or in parallel therewith. This actuator may, as described above for example, be achieved by a tap changer in the first transformer or by an inverter in the energy supply path in parallel with the first transformer, in which the output voltage of the energy supply path is added to the voltage of the secondary side of the first transformer through a series connection. Furthermore, this actuator is able to bring the operating points, which are located further away from the resonance due to the input and output voltage, closer to the resonance by way of a variable voltage amplification. The losses in the semiconductors of the inverter circuit are therefore reduced due to the smaller spacing apart from the resonance frequency and the degree of efficiency of the resonant converter is increased compared to conventional converter topologies. As an alternative to the implementations listed above, the actuator may also be implemented by a multiplexer circuit, which is located in parallel with the transformer. Depending on the number of individual stages, these may be switched on or off individually.

The effect of the variable transformation ratio lies in the resonant-switching inverter circuit, due to this topology, being able to be designed for a large range of input and output voltages with a high degree of efficiency. This means that all the operating points lie close to the resonance frequency, in order to obtain a sinusoidal current characteristic. In order to vary the transformation ratio, it is no longer necessary to influence the frequency of the inverter circuit, but rather by using the variable transformation ratio of the transformer unit it is possible to influence the voltage at the output of the rectifier circuit even without changing the frequency. In this context, the resonant bridge circuit should have a large dynamic range with various input voltages and a constant output voltage. To this end, the greater switch-off losses at frequencies which are further away from the resonance frequency are avoided by operating points in the vicinity of the resonance frequency being chosen at a lower transformation ratio. By way of the variable transformation ratio, it is possible, for a wide power range, for the switching frequency to be chosen which is close to the resonance frequency. As a result, the occurrence of greater switch-off losses in the semiconductor switch at the operating point can be avoided, as the operating point no longer has to be chosen to be so far away from the resonance frequency. As a result, the operating behavior is improved and the switch-off losses of the semiconductor switch are very low due to being close to the resonance frequency.

The advantages of the resonant DC chopper on the one hand lie in the extremely low switch-on and switch-off losses of the semiconductors in the inverter circuit and the high degree of efficiency of the DC chopper over a large operating range associated therewith. Furthermore, due to this novel topology with an additional actuator in the bridge arm, the use of a filter is dispensed with as, due to the operation with a variable transformation ratio, the sinusoidal characteristic is able to be generated in the bridge arm and the occurrence of undesirable harmonics is avoided.

BRIEF DESCRIPTION OF THE DRAWING

The invention will be described and explained in more detail below on the basis of the exemplary embodiments shown in the figures, in which.

DETAILED DESCRIPTION OF PREFERRED EMBODIMENTS

Figure 1:
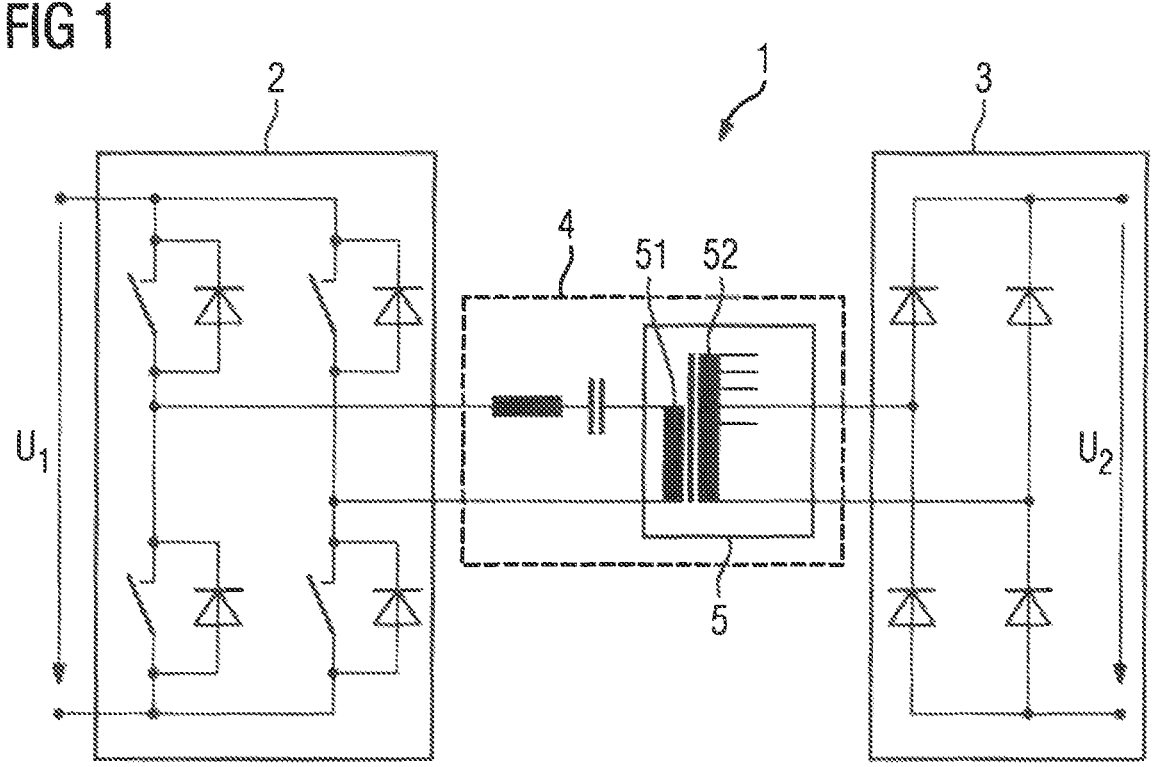
FIG. 1 shows a resonant DC chopper with a transformer with tap changer.
Figure 2:
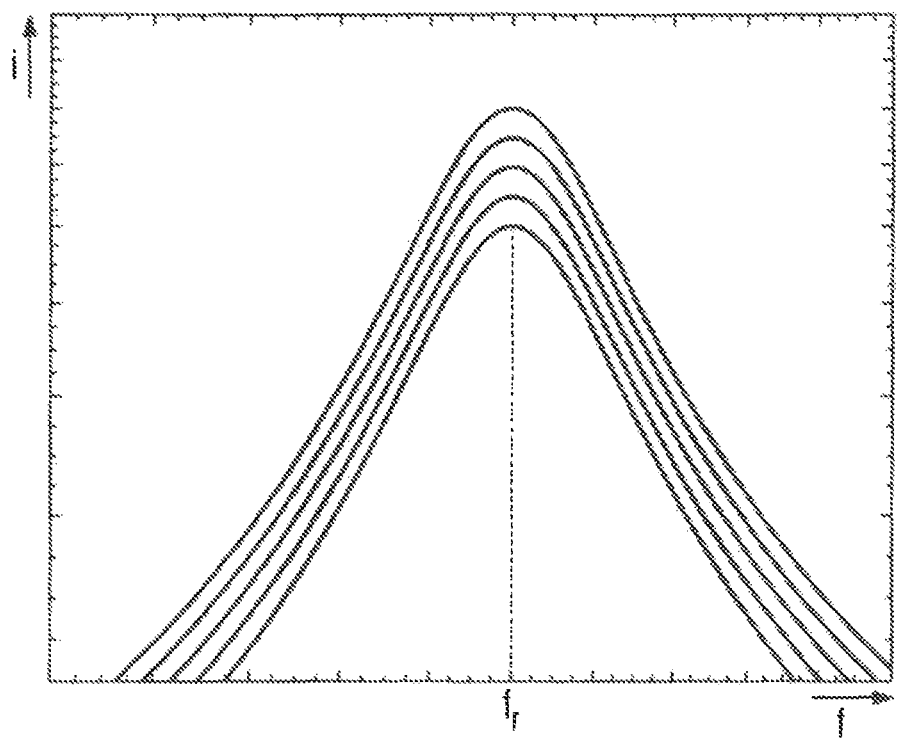
FIG. 2 shows the frequency response of the resonant DC chopper.
Figure 3:
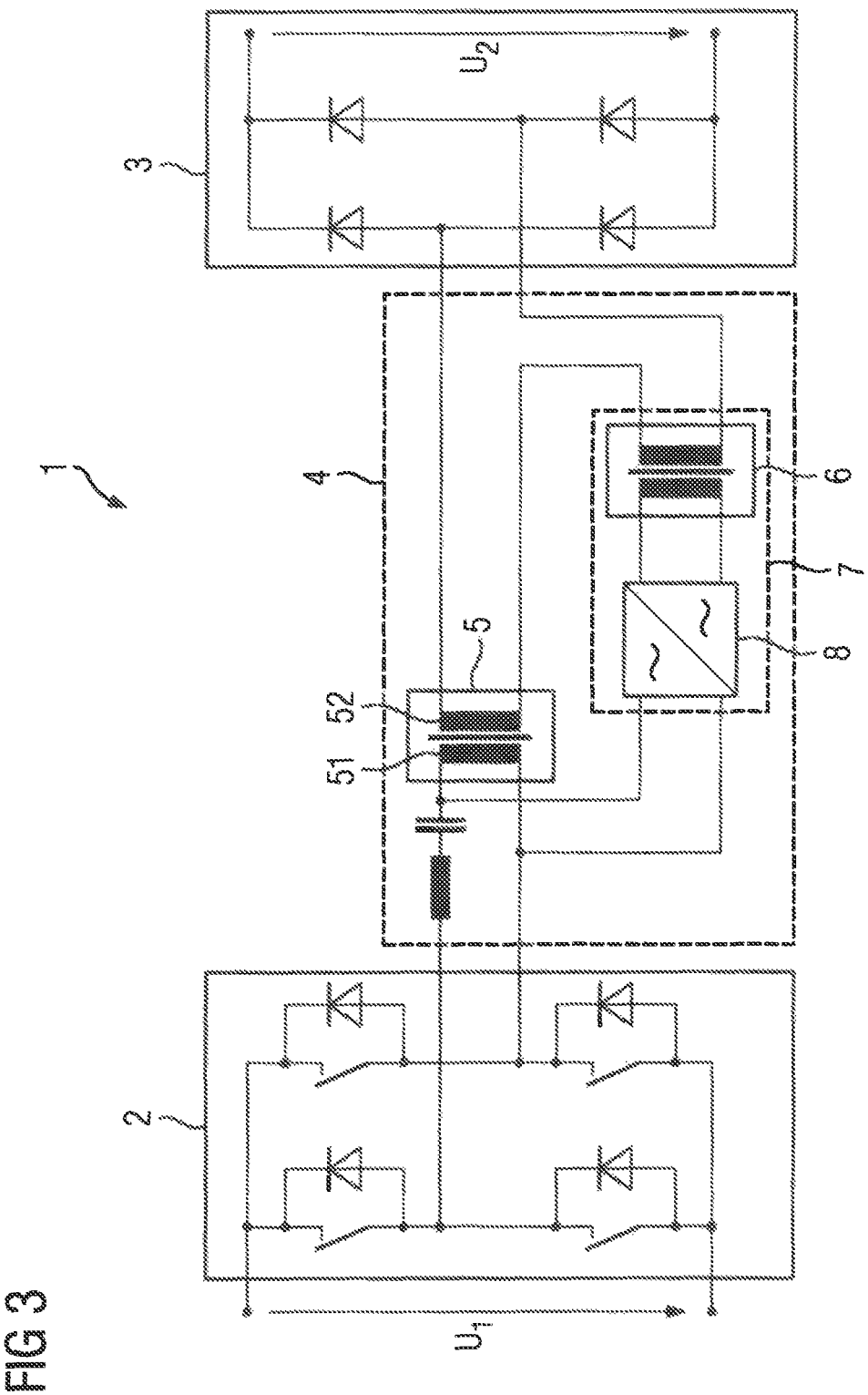
FIG. 3 shows a resonant DC chopper with energy transfer path.

FIG. 1 shows an exemplary embodiment of a resonant DC chopper 1 with a first transformer 5 with a tap changer, which can be switched under load. The DC chopper 1 is able to convert an input voltage $U_1$ into an output voltage $U_2$. To this end, an AC voltage is generated in the inverter circuit 2. Using this, electrical energy can be transferred from the inverter circuit 2 to a rectifier circuit 3 with the aid of the transformer unit 4. To this end, inverter circuit 2 and rectifier circuit 3 are connected to the transformer unit 4 in each case. In this context, the transformer unit comprises means for varying the transformation ratio i of the transformer unit 4. This means for varying the transformation ratio i, in a simple embodiment, may be a tap changer in the first transformer 5. Due to the tap changer, the amplification of the transformer unit 4 can be set close to the resonance frequency, on an individual basis with regard to the particular operating point with a particularly high degree of efficiency. The turns ratio and the number of stages of the tap changer are advantageously to be designed for the respective application. FIG. 2 shows the transformation ratio i of the transformer unit 4 as a function of the frequency of the generated AC voltage. The different lines depict different positions of the tap changer or different voltages added on the secondary side of the first transformer by means of a series connection. It is clear that a varying of the transformation ratio now no longer cannot only be achieved by a variation of the frequency, but also by varying the position of the tap changer. Alternatively, it is possible to add on the secondary side of the first transformer a voltage which influences the transformation ratio i of the transformer unit. Here, FIG. 2 clearly shows that the voltage amplification can be predefined via the tap changer. It is therefore possible to trace the operating point close to the resonance with a particularly high degree of efficiency over a large dynamic range. It should be noted here that the number of stages and the setting range are to be designed for the corresponding application in each case. Technically, the variation of the voltage amplification can also be implemented using an inverter, as is shown in FIG. 3. For the avoidance of repetition, reference is made to the description relating to FIG. 1 and the reference characters therein. The inverter 8 is arranged in an energy transfer path 7 in parallel with the first transformer. In this context, the energy transmission path 7 takes energy from the inverter circuit 2, in that the energy transfer path is arranged in parallel with the primary winding 51 of the first transformer 5. In order to be able to influence the voltage at the output of the transformer unit 4, the output of the energy transfer path 7 is arranged in series with the secondary winding 52 of the first transformer. The series connection simultaneously forms the output of the transformer unit 4. In order to galvanically isolate the input and output of the DC chopper 1, a second transformer 6 is advantageously arranged in the energy transfer path 7. With this circuit, it is possible to produce a transfer behavior as in FIG. 2, wherein the array of curves is then able to have any desired number of curves, as the inverter is able to generate practically any voltages desired.

In summary, the invention relates to a resonant DC chopper with an inverter circuit, a rectifier circuit and a transformer unit, wherein the inverter circuit is connected to a first terminal of the transformer unit and the rectifier circuit is connected to a second terminal of the transformer unit. In order to improve the DC chopper, it is proposed that the first and the second terminal are galvanically isolated from one another by means of a first transformer, wherein the transformer unit has means for adapting the transformation ratio of the transformer unit, wherein the transformer unit has an energy transfer path, wherein the energy transfer path has an inverter and a second transformer, wherein the input of the energy transfer path is arranged in parallel with the primary side of the first transformer and the output of the energy transfer path is arranged in series with the secondary side of the first transformer.

The invention claimed is:

1. A resonant DC chopper, comprising:
 a DC-AC inverter circuit converting a DC input voltage to an AC voltage;
 a transformer unit having a first terminal connected to the AC voltage of the DC-AC inverter circuit, a first transformer having a primary winding connected to the first terminal by way of a series connection composed of a capacitance and an inductance and a secondary winding connected to a second terminal of the transformer unit an energy transfer path having an AC-to-AC inverter with an input connected in parallel with the primary winding of the first transformer between the series connection and the first transformer and an output connected to a primary winding of a second transformer having a secondary winding connected in series with the secondary winding of the first transformer such that output voltages of the first transformer and the second transformer are adjusted by varying a voltage amplification of the AC-to-AC inverter; and
 a rectifier circuit connected to the second terminal of the transformer unit.

2. The resonant DC chopper of claim 1, wherein the first transformer has a tap changer.

3. The resonant DC chopper of claim 1, wherein 75% of a total power is transferred via the first transformer and 25% of the total power is transferred via the energy transfer path.

* * * * *